(12) United States Patent
Snider (10) Patent No.: US 7,512,388 B2
(45) Date of Patent: Mar. 31, 2009

(54) MULTIBAND OR MULTIMODE FRONT END ANTENNA SWITCH

(75) Inventor: James Roderick Snider, Kildeer, IL (US)

(73) Assignee: Skyworks Solutions, Inc., Woburn, MA (US)

( * ) Notice: Subject to any disclaimer, the term of this patent is extended or adjusted under 35 U.S.C. 154(b) by 502 days.

(21) Appl. No.: 11/233,570

(22) Filed: Sep. 22, 2005

(65) Prior Publication Data

US 2007/0066245 A1    Mar. 22, 2007

(51) Int. Cl.
*H04B 1/18* (2006.01)
(52) U.S. Cl. ............... 455/168.1; 455/101; 455/188.1; 455/552.1
(58) Field of Classification Search ................. 455/101, 455/103, 132, 160.1, 168.1, 188.1, 272, 292, 455/552.1, 553.1
See application file for complete search history.

(56) References Cited

U.S. PATENT DOCUMENTS

| | | | |
|---|---|---|---|
| 4,882,588 A | 11/1989 | Renshaw et al. | |
| 5,895,436 A | 4/1999 | Savoie et al. | |
| 6,466,768 B1 | 10/2002 | Agahi-Kesheh et al. | |
| 6,690,949 B1 | 2/2004 | Shamlou et al. | |
| 6,806,838 B2 | 10/2004 | Petros et al. | |
| 7,155,251 B2* | 12/2006 | Saruwatari et al. | ....... 455/552.1 |
| 2002/0006810 A1 | 1/2002 | Schiller | |
| 2002/0072326 A1 | 6/2002 | Qureshey et al. | |
| 2004/0032373 A1 | 2/2004 | Petros et al. | |
| 2004/0127182 A1* | 7/2004 | Hayashi | .................. 455/193.1 |
| 2004/0217914 A1* | 11/2004 | Yamashita et al. | .......... 343/850 |
| 2004/0227666 A1 | 11/2004 | Adachi et al. | |
| 2004/0266378 A1* | 12/2004 | Fukamachi et al. | ....... 455/188.1 |
| 2005/0143023 A1* | 6/2005 | Shih | ........................... 455/101 |
| 2005/0277387 A1* | 12/2005 | Kojima et al. | ................. 455/78 |

* cited by examiner

*Primary Examiner*—Nhan T Le
(74) *Attorney, Agent, or Firm*—Weide & Miller, Ltd.

(57) ABSTRACT

A multi-band communication device with a front end antenna switch module having a reduced number of control inputs is disclosed. Control over an antenna switch modules occurs via control inputs from a controller or processor to enable operation over multiple bands or under numerous different standards. In one embodiment an input/output port is configured to connect to an antenna and a diplexer is connected to the input/output port. In this embodiment, the diplexer is configured to pass outgoing signals to the antenna and direct incoming signal from the antenna to one of two or more paths. One or more switches are connected to the diplexer such that the one or more switches are responsive to two or fewer control signals. The switch are configured to selectively enable operation of the antenna switch module into transmit or receive mode. A filter bank may also be provided as part of the module.

20 Claims, 6 Drawing Sheets

MULTIBAND OR MULTIMODE FRONT END ANTENNA SWITCH

FIELD OF THE INVENTION

The invention relates to communication systems, and in particular to a multiple band antenna switch module.

RELATED ART

It has become increasingly important to minimize the size, weight, complexity, power consumption, and cost of various electronic devices, especially personal communication devices such as cellular telephones, personal pagers, cordless telephones, and the like. One way to minimize such characteristics is to minimize the number of components and connections in the electronic device, or to perform multiple functions using the same components. However, personal communication devices such as cellular telephones often utilize complex circuitry with a number of power-inefficient components for performing multiple functions to enable an expanded set of features. This is especially true for modern cellular communication, where several different communication standards are employed worldwide, and cellular telephones with the flexibility to operate under multiple communications standards are highly desirable from a consumer and manufacturing perspective.

For example, the Global System for Mobile (GSM) communication standard is a world-wide mode of digital cellular communication operating over up to four different frequency bands. EGSM-operates in the 900 MHz frequency band and is currently used in Europe and Asia. DCS is another digital cellular standard based on GSM technology, operating in the 1800 MHz frequency band, and is currently used in Europe and Asia. The United States uses PCS, a third digital cellular standard similar to DCS, but operating in the 1900 MHz band. The United States also uses GSM850, operating in the 800 MHz frequency band. Moreover, GSM and possibly other standards are being adopted for use in the United States. GSM is used in over 154 countries, including the geographic areas of North Africa, India, China, Europe, the Middle East, and Taiwan.

GSM is not the only mode of cellular communication. CDMA is another mode of digital cellular communication operating in either the 900 or 1900 MHz frequency band. CDMA has been one of the most widely used modes of cellular communication in the United States, and is the most widely used mode of cellular communication in Korea. CDMA is also being used in China, India, and Taiwan. It should be noted that other communication standards also exist around the world.

With improved voice and data communications and political climates continuing to expand the world market, a "world telephone" capable of operating in many different countries is of interest to international business and recreational travelers. Multi-mode, multi-band cellular telephones with shared functionality capable of operating under all of these standards afford consumers widespread applicability and allow manufacturers to benefit from the cost-efficiency of a common design.

However, multi-mode, multi-band communication devices present a number of design challenges. One such design challenge is that the analog front end of the multimode communication devices must be capable of accommodating the multiple bands of operation. By way of example, in a quad band communication device, it is desired that a single antenna receive and provide a signal, which may be in any of multiple different bands, to the receiver amplifier stages, such as a low noise amplifier associated with that band. Similarly, appropriate interface must occur for outgoing signals, such as between the power amplifiers of the transmit stage and the antenna. Furthermore, the frequencies and parameters employed by each band and mode may require different filters and amplifiers for the transmit and receive function of each band.

Prior art solutions included antenna switch modules (ASM) to perform the interface between the amplifier stages and the antenna. Such prior art ASM suffer from numerous disadvantages. On such disadvantage is excessive cost and complexity. For example, prior art ASM utilized either 6 or 8 pHEMPPT/FET switches, which are costly and consume undesirably large amounts of circuit space. In addition, such prior ASM utilize three or more control lines for configuration and control. This consumes valuable circuit control lines and increases complexity of operation by orders of magnitude. As a result of the design challenge associated with producing communication devices of minimal size, weight, complexity, power consumption, and cost there exists a need for an improved interface between the amplifier stages and antenna in a multiband communication device.

SUMMARY

To overcome the drawbacks of the prior art and provide additional benefits as described herein an antenna switch module is disclosed that utilizes a reduced number of control inputs and switch devices as compared to prior art modules. In one embodiment an antenna switch module is disclosed for use in a multi-band communication device. In this embodiment an input/output port is configured to connect to an antenna and a diplexer is connected to the input/output port. In this embodiment, the diplexer is configured to pass outgoing signals to the antenna and direct incoming signal from the antenna to one of two or more paths. One or more switches are connected to the diplexer such that the one or more switches are responsive to two or fewer control signals. The switch are configured to selectively enable operation of the antenna switch module into transmit or receive mode. Also part of this embodiment is a filter bank, which is connected to the one or more switches and which comprise two or more filters, two or more diplexers, or both. The filter bank is configured to selectively filter incoming and outgoing signals in a frequency dependent matter to tailor operation for a particular band.

In one embodiment the diplexer is configured to direct incoming signals based on the frequency of the incoming signal. In one embodiment the one or more switches comprises two switches and the two switches may comprise FET switches. It is further contemplated that the antenna switch module is configured as part of quad band communication device and that the output of the filter bank may connect to an amplifier stage. It is also contemplated that this embodiment may comprise a controller or processor configured to generate the two or fewer control signals.

Also disclosed herein is a multiband antenna switch module having an input/output port configured to connect to an antenna. The module also comprises a first diplexer connected to the input port configured to direct incoming signal based on frequency. A first switch, responsive to a control signal, is configured to receive incoming signals and transmit outgoing signals in a first frequency band. A second switch, responsive to a control signal, is configured to receive incoming signals and transmit outgoing signals in a second frequency band. A second diplexer is configured to provide incoming signals from the first switch to a filter based on the frequency of the incoming signal. A third diplexer is configured to provide incoming signals from the second switch to a filter based on the frequency of the incoming signal. To provide filtering, one or more filters connect to the first and second switch and the second and third diplexer such that the one or more filters are configured to selectively pass incoming or outgoing signals.

In one embodiment the first switch and the second switch receive the same control signal. Furthermore, the first switch receives a first control signal and the second switch receives a second control signal. It is possible for the first and second switches to comprise FET switches. In one embodiment, the first diplexer is configure to direct incoming signals within the 1700 megahertz to 2000 megahertz band to the first switch and direct incoming signals within the 800 megahertz to 1000 megahertz band. For example, the multiband antenna switch module may be configured for use in a quad band communication device comprising at least DCS band, PCS band, GSM850, and EGSM band.

A method for interfacing an antenna to an amplifier stage in a multiband communication device comprising receiving an incoming signal via an antenna and then providing the incoming signal to a first diplexer such that the first diplexer selectively directs the incoming signal to a first switch or a second switch. The method, at some point, provides two or fewer control signals to the first switch and the second switch to selectively route the incoming signal to a second diplexer or a third diplexer. At this stage, the method selectively directs the incoming signal, with the second diplexer or the third diplexer, to a filter tailored to the frequency band of the incoming signal. Thereafter, the method filters the incoming signal with the filter tailored to the frequency band of the incoming signal and providing the incoming signal to the amplifier stage.

In one embodiment this method further comprises receiving an outgoing signal from a power amplifier and filtering the outgoing signal. Then, responsive to the two or fewer control signals, switching the outgoing signal through either the first switch or the second switch to the first diplexer and passing the outgoing signal through the first diplexer to the antenna. It is contemplated that in one embodiment the two or fewer control signals comprises one control signal, which is provided to both the first switch and the second switch. In one embodiment the first switch and the second switch may comprise FET switches. The step of selectively directing the incoming signal with the second diplexer or the third diplexer may comprise passing the signal based on the frequency of the incoming signal. In one embodiment this method is performed in a quad band communication device equipped with a single antenna.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

To overcome the drawbacks of the prior art and provide additional benefits as described below, a multiband antenna switch module is disclosed that is configured with a reduced number of switches or control inputs. This in turn reduces the complexity and cost of the antenna switch module. Additional details and benefits are discussed below. The term multiband and multimode are often used interchangeable in the communications industry and herein.

Figure 1:
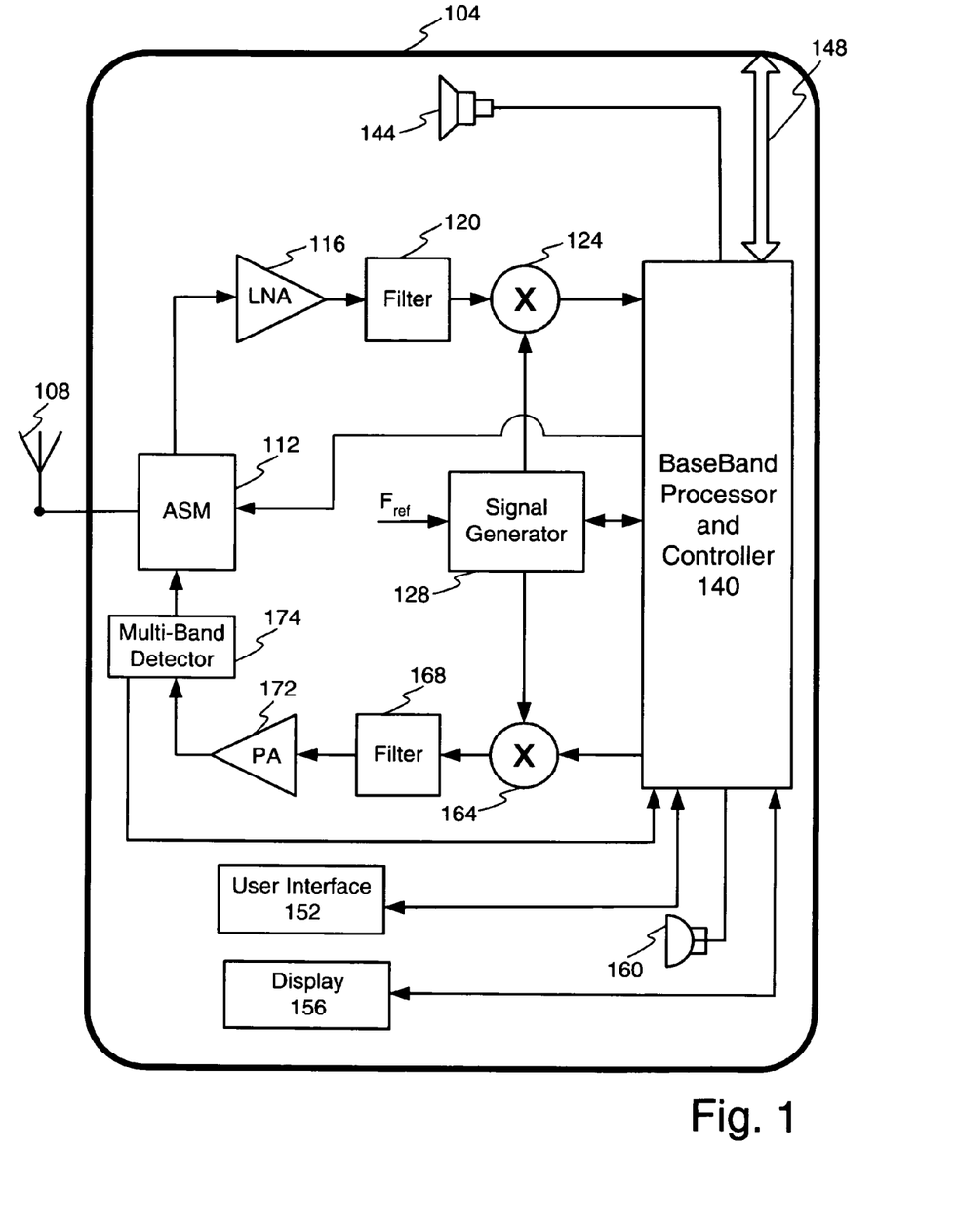
FIG. 1 illustrates an example environment of use of the antenna switch module described herein.

Before turning to the various embodiments of the multiband antenna switch module, an example environment of operation is provided. This is but one example environment and as such, it is contemplated that the method and apparatus described herein may find application in numerous other environments. FIG. 1 illustrates a block diagram of a first example environment of use of the invention. The example environment shown in FIG. 1 comprises a mobile communication device. It is contemplated that the invention may find use and provide benefit in numerous other environments both in the communication field and other fields of use.

The mobile communication device shown in FIG. 1 comprises an outer housing 104 configured to protect and selectively enclose the internal electronic apparatus. An antenna 108 receives incoming signals and transmits outgoing signals. The antenna 108 may be located inside or outside of the housing 104. An antenna switch module 112 connects to the antenna 108 to route incoming signals to a receiver apparatus, shown as the upper path from the antenna switch module and route outgoing signals to the antenna.

The antenna switch module 112 connects to a receiver apparatus to thereby route received signals to a low noise amplifier (LNA) 116 that is configured to increase a signal's power level for a particular frequency band to a level appropriate for processing by subsequent apparatus. The LNA 116 output connects to a filter 120 which may be configured to perform additional filtering or processing, such as for example band pass filtering or processing to mitigate the effects of the wireless channel.

After filtering, a mixer 124, also known as a down-converter, processes the received signal in conjunction with a signal from a signal generator 128. The mixer 124 may be configured to extract a baseband signal by multiplying the received signal at a carrier frequency with a signal from the signal generator 128 that is also at the carrier frequency. As is well understood, the mixer 124 outputs the desired carrier signal.

The output from the mixer 124 feeds into a baseband processor and controller 140 configured to receive and process the incoming baseband signal. In one embodiment, the baseband processor and controller 140 converts the incoming signal to a digital format, processes the digital signal, and then creates an analog signal which is provided to a speaker 144. Alternatively the digital signal may be provided directly to a data port 148. In this embodiment, the baseband processor and controller 140 is in communication with the signal generator 128 to synchronize operation. The controller 140 may also provide one or more control signals to the antenna switch module 112.

The baseband processor and controller 140 may also configured to communicate data to and from a user interface 152, such as with one or more keys or buttons, and a display 156 configured to display text, graphics, or other information to a user.

To perform transmission of outgoing signals, the baseband processor and controller 140 may receive a signal from a microphone 160 or digital data from the data port 148. Upon receipt of an outgoing signal, the baseband processor and controller 140 processes the outgoing information to a baseband signal and output this baseband signal to a mixer 164, which may also be referred to as an up-converter. The mixer 164 multiplies the baseband signal with an input from the signal generator 128 at the desired carrier frequency. The resulting outgoing signal comprises the baseband signal modulated to the carrier frequency and is ready for filtering and processing by the filter 168 and then amplification by a power amplifier 172 to a power level suitable for transmission by the antenna 108 after passing through the antenna switch module 112.

In this embodiment a multiband detector 174 receives the output from amplifier 172. The multiband detector 174 may monitor one or more aspects of the outgoing signal, such as amplitude or power level. In one embodiment, the detector 172 may provide a feedback or data signal to the controller 140 as shown. As discussed below in more detail, the detector 174 may monitor the amplitude of the outgoing signal, i.e. the signal being transmitted, and provide information regarding the amplitude to the controller 140.

Figure 2:
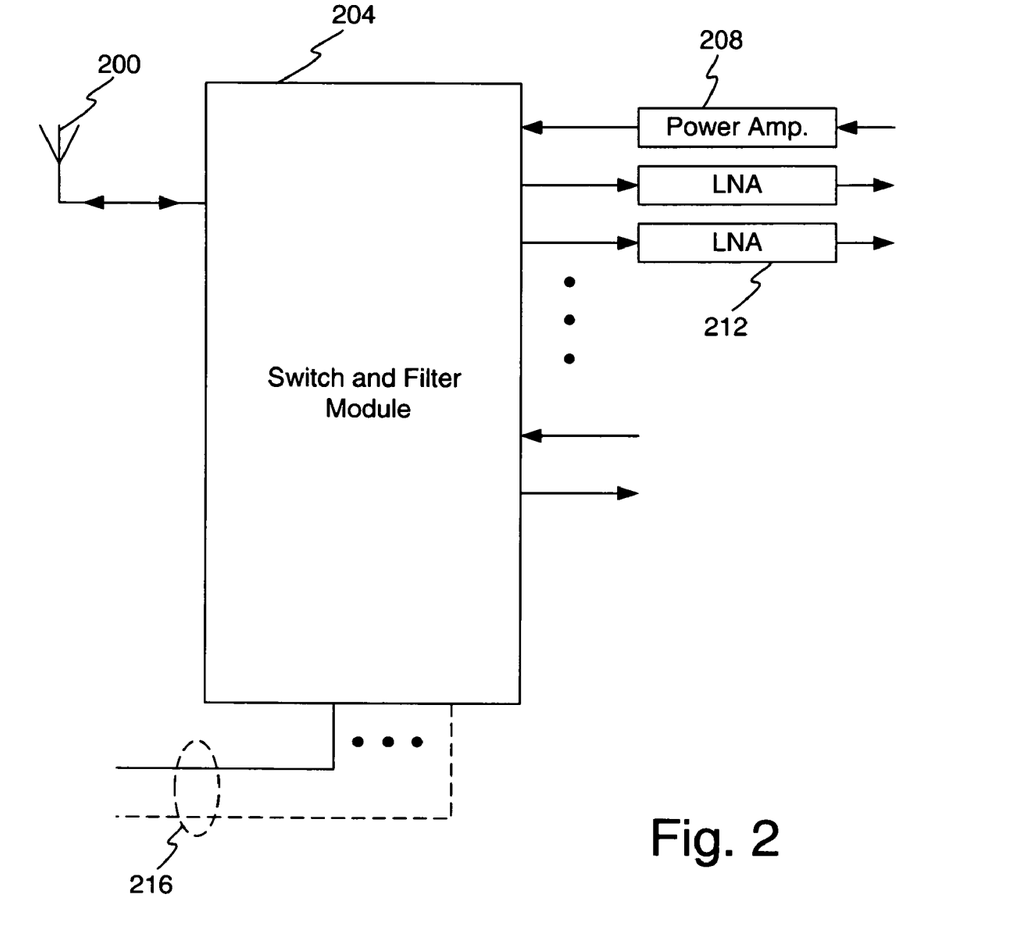
FIG. 2 illustrates a first example embodiment of a multiband antenna switch module.

FIG. 2 illustrates an example embodiment of a multiband antenna switch module. This is but one possible switch module configuration and as such, it is contemplated that other embodiments may be created which do not depart from the claims that follow. It is contemplated that the configuration of FIG. 2 includes one or more of the features of the invention as described below.

In this example embodiment, an antenna 200 connects to or interfaces with a switch and filter module 204. In this example embodiment a single antenna is provided, but in other embodiments a greater number of antenna may be utilized. As shown the connection between the antenna 200 and the switch and filter module 204 comprise a bidirectional path capable of providing an outgoing signal to the antenna for transmission and also receiving and providing an incoming signal, from the antenna, to the communication device. Any type antenna 200 may be utilized.

The switch and filter module 204 comprises any combination of filters, switches, or other elements, any of which may be active, passive, or both, that are configured to operate as described herein. In one embodiment the switch and filter module 204 is configured with two switches while in another embodiment the switch and filter module comprises a single switch. In other embodiments more than two switches maybe configured to realize the benefits described herein. It is further contemplated that the one or more filters of the switch and filter module 204 may be configured as diplexers.

Control signals are provided to the switch and filter module 204 via control inputs 216. Any number of control inputs 216 may be utilized. In one embodiment a single control input 216 is used while in another embodiment two control inputs are used. The control inputs 216 may comprise a single conductor or multiple conductors, such as multiple parallel paths.

The output of the switch and filter module 204 connect to one or more amplifier stages, which may comprise one or more power amplifiers or one or more low noise amplifiers. In one embodiment the input from a transmitter portion of the communication device is provided to the switch and filter module 204 from a power amplifier 208. One or more outputs from the switch and filter module 204 connect to low noise amplifiers 212, which may be part of a receiver portion of the communication device. There may be inputs from and outputs to the amplifier stage from the switch and filter module 204.

During operation it is contemplated that a controller, DSP, processor, or other control device is controlling operation of the communication device, such as transmit and receive opportunities. As such, the controller, DSP, processor, or other control device is capable of signally to the antenna switch module when the communication device is in transmit mode and when the communication device is in receive mode.

During operation in transmit mode, the power amplifier 208 or other input to the switch and filter module 204 from a transmitter, receives an outgoing signal. Concurrently or close in time a control signal is provided on the one or more control inputs 216 to the switch and filter module 204. The receipt of the one or more control signals by the switch and filter module 204 configures the switch and filter module to route the outgoing signal to the antenna. The switch and filter module 204 provides isolation between the output ports of the one or more amplifiers and the inputs to the LNA so that the outgoing signal is not provided to the LNA and thereby not damaged. The switch and filter module 204 also provides isolation between the power amplifier 208 providing the outgoing signal other power amplifiers thereby preventing harmonics, such as second harmonics, from being delivered to the antenna port. The outgoing signal passes through the switch and filter module 204 to the antenna 200 where it is radiated as a transmitted signal.

After transmit mode the communication device changes to receive mode whereby the switch and filter module 204 receives a control signal to prepare the switch and filter module to receive signals from the antenna. The control signals modify one or more switch positions or switch status to direct the incoming through the switch and filter module 204 to the appropriate filter or LNA 212. In one embodiment only one LNA is activated to reduce amplification of noise, unwanted signals or noise.

Figure 3:
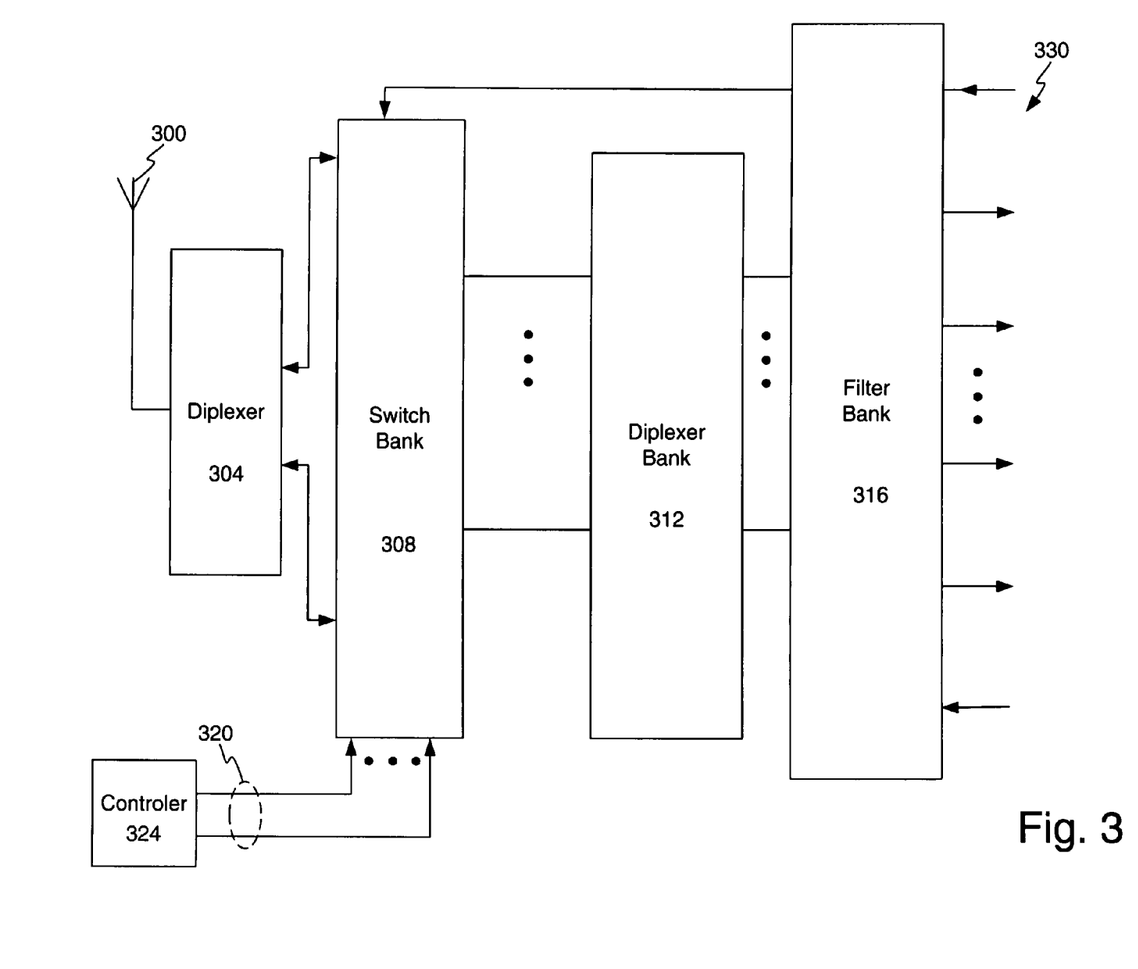
FIG. 3 illustrates a second example embodiment of a multiband antenna switch module.

FIG. 3 illustrates an example embodiment of a multiband antenna switch module. This is but one possible example embodiment of a multiband antenna switch module as described herein. In this example embodiment, an antenna 300 connects to a diplexer 304, which in turn connects to a switch bank 308. The switch bank connects to a diplexer bank 312 and may also connect to a filter bank 316. The switch bank 308 may also receive one or more control signals on control inputs 320 which are generated by a controller 324. The controller 324 may comprise any device capable of generating the one or more control signals. The controller 324 may comprise, but is not limited to a processor, microprocessor, ASIC, logic, digital signal processor, or any device with a general purpose outputs capable of providing control signals to one or more switches. It is contemplated that a controller may be associated with any of the embodiments shown, described, or claimed herein. The controller 324 may comprise hardware, software, or a combination of both.

The diplexer 312 connects to the filter bank 316 as shown. In one embodiment the diplexers 312, 304 may comprise any number of active or passive devices or a combination of both. In one embodiment, the diplexers 312, 304 comprise filters. The opposing input/outputs 330 of the filter bank 316 connect to transmit and receive portions of the communication device via the inputs and outputs as shown. In one embodiment the filter bank 316 connects to an amplifier stage of a transceiver. The filters 312, or any filter shown herein, may comprise any device, whether active or passive, capable of selectively passing or regenerating a frequency specific portion of a received signal. In one embodiment, the filters may be integrated as part of the integrated circuit (IC) while in other embodiments the filters may be external to the IC. In one embodiment, one or more of the filters comprise high Q saw filters.

In operation, the system shown in FIG. 3 operates generally similar to that described above in connection with FIG. 2. The diplexers 304, 312 and the filter bank 316, in connection with the switch bank 308, selectively filter and direct incoming signals to an amplifier stage to thereby pass and amplify only signals in the desired band during the active mode of operation. Likewise, the diplexers 304, 312 and the filter bank 316, in connection with the switch bank 308, selectively filter and direct outgoing signals to the antenna 300 to thereby transmit the outgoing signal. The switch bank 308 selectively connects the transmit portions and receiver portions of the communication device to the antenna and amplifier stage based on the control signals on inputs 320 from a controller 324. The controller 324 may generate the control signals based on the mode of operation, which may comprise the mode or band currently in use or the status of the communication device, such as but not limited to, transmit or receive status.

Figure 4:
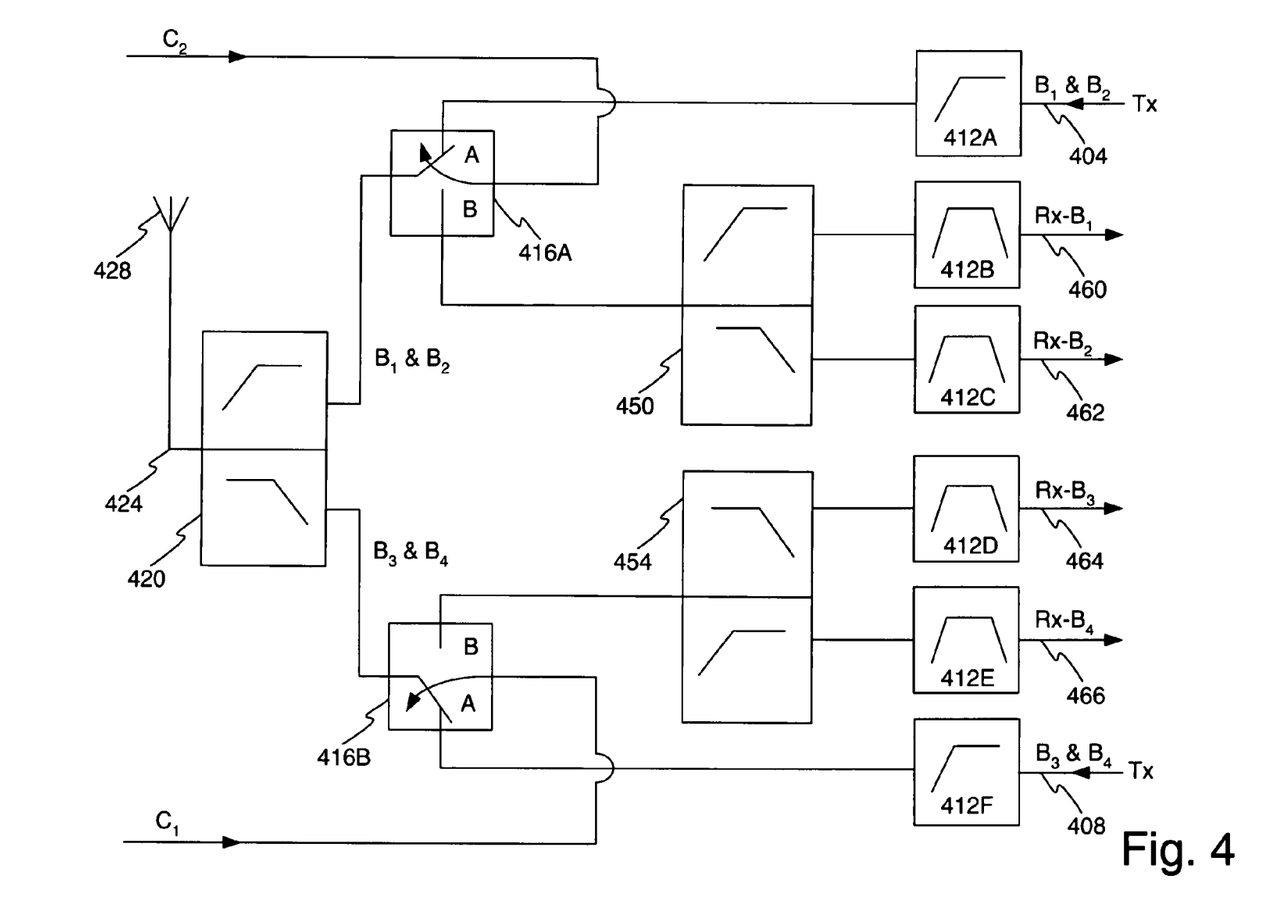
FIG. 4 illustrates an example embodiment of a quad band antenna switch module with two control inputs.

FIG. 4 illustrates an example implementation of a quad band antenna switch module with duel control inputs. This is but one possible implementation that adopts the principles as set forth herein and as such, one of ordinary skill in the art will be able to configure different implementations which do not depart from the scope of the claims. In this example embodiment, the receive path and transmit path through the antenna switch module are separately described.

Transmit Path

In this example embodiment the transmit path starts at path Tx for $B_1$ and $B_2$ 404 and path Tx for $B_3$ and $B_4$ 408. It is contemplated that bands $B_1$ and $B_2$ are both compatibly close or related in their respective frequency range while the bands $B_3$ and $B_4$ also utilize a compatibly close frequency band. In this example embodiment $B_1$ and $B_2$ are collectively referred to as operating in the lower frequency bands while bands $B_3$ and $B_4$ are referred to as operating in the upper frequency bands.

Inputs 404, 408 to the switch module may connect to power amplifiers (not shown) to receive amplified signals suitable for transmission via the antenna 428. The notation $B_1$-$B_4$ designates four different communication bands within which the communication device may be capable of operation. In this embodiment, it is contemplated that only one band may be active at a time, although in other embodiments, multiple bands may be concurrently operational. Any type switch, discussed below, may be utilized. The switches may comprise, but are not limited to FET, GasFET, pHEMP, PIN diode, MOSFET type switches, or any other type of switch.

The transmit input 404 to the antenna switch module connects to a filter 412A, which in turn connects to a switch 416A. The output port of the switch 416A connects to a diplexer 420 as shown. The input/output port 424 of the diplexer 420 connects to an antenna 428. A control input $C_2$ connects to the switch 416A to provide a switch control signal that selectively controls the switch position to thereby control the resulting connection.

The transmit input Tx $B_3$ and $B_4$ for the third and fourth bands are provided to the antenna switch module from output 408 to a filter 412F, which in turn connects to a switch 416B. The output port of the switch 416B connects to a diplexer 420 as shown. The input/output port 424 of the diplexer 420 connects to an antenna 428. A control input $C_1$ connects to the switch 416B to provide a control signal that selectively controls the switch position to thereby control the resulting connection made by the switch.

During operation, a controller (not shown in this figure) generates a control signal responsive to the Tx/Rx status of the communication device. In one embodiment, when the control signal on input $C_2$ is high and the control signal on input $C_1$ is low, the lower frequency bands, namely $B_1$ & $B_2$, are in transmit mode. In contrast, when the control signal on input $C_2$ is low and the control signal on input $C_1$ is high, the upper frequency bands, namely $B_3$ & $B_4$, are in transmit mode. In this embodiment, if the control signals on control lines $C_1$ and $C_2$ are both low, then the communication device is in receive mode, which is discussed below.

During transmit operation, a controller provides the control signals to the switches 416, which in turn selectively connects the switch inputs/outputs to the desired position. When transmitting in the lower frequency bands of $B_1$ and $B_2$, switch 416A connects to position A thereby connecting the output of filter 412A to the diplexer 420 while switch 416B creates an open circuit between the filter 412F and the diplexer 420 by being switched to position B. Conversely, when transmitting in the upper frequency bands of $B_3$ and $B_4$, switch 416B connects to position A thereby connecting the output of filter 412F to the diplexer 420 while switch 416A creates an open circuit between the filter 412A and the diplexer 420 by switching to position B. It is contemplated that a single switch may be utilized, such as a single pole, four throw switch. It is also contemplated that two switches, namely single pole, double throw type switches, may be utilized as shown.

The switch that is connected to the receiver path, which may be established in an open circuit state, creates sufficient isolation between the transmit stage to the receiver components. In one embodiment, $2^{nd}$ harmonic noise from the active band may couple into the inactive band thereby creating unwanted noise or interference.

Receive Paths

Turning now to the receive paths of FIG. 4, when the communication device is in receive mode, a controller provides appropriate control signals to the switches 416. After or concurrently with configuration of the switches 416 as discussed below, an incoming signal is received on the antenna 428 and provided to the duplexer 420. The duplexer 420 is configured as a frequency responsive device to pass incoming signals in the upper frequency band to switch 416A and route incoming signals in the lower frequency bands to switch 416B. During receive mode, the control signals configure the switches to connect the duplexer 420 to the diplexers 450, 454 as shown. Thus, during receive mode, all received incoming signals are passed through switches 416. During receive mode, the switches 416 are both in position B.

In this example embodiment, the diplexer 450 receives signals in the upper frequency bands while the diplexer 454 receives signals in the lower frequency bands. The diplexer 450 performs in a similar manner to the diplexer 420, but with a different frequency cut-off point for directing the incoming signal to either filter 412B or filter 412C. In this embodiment the diplexer 450 directs signals in frequency band $B_1$ to filter 412B while directing signals in frequency band $B_2$ to filter 412C.

Filter 412B is configured to process a received signal to allow only aspects of the signal within a particular frequency band to pass to the receiver via path 460. Similarly, filter 412C is configured to process a received signal to allow only aspects of the signal within a particular frequency band to pass to the receiver via path 462. Filter operation and construction is generally understood by one of ordinary skill in the art and is therefore not described in great detail herein.

The diplexer 420 also connects to switch 416B, which during receive mode has an opposing port connected to a diplexer 454. The diplexer 454 performs in a similar manner to diplexer 450 by directing or passing the incoming signal, based on frequency, to either filter 412D or filter 412E. As compared to diplexer 450, the frequency cut-off points for diplexer 454 are different. In particular, the diplexer 454 directs or passes signals in frequency band $B_3$ to filter 412D while directing or passing signals in frequency band $B_4$ to filter 412E.

Filter 412D is configured to process a received signal to allow only aspects of the signal within a particular frequency band to pass to the receiver via path 464. Similarly, filter 412E is configured to process a received signal to allow only aspects of the signal within a particular frequency band to pass to the receiver via path 466. Filter operation and construction is generally understood by one of ordinary skill in the art and is therefore not described in great detail herein.

The following table describes the control input values in relation to Tx/Rx status for a two switches 416 of the antenna switch module.

| Control Input C1 | Control Input C2 | Communication Device Status | Switch 416A Position | Switch 416B Position |
|---|---|---|---|---|
| 0 | 0 | Received all bands | B | B |
| 0 | 1 | Transmit Bands B1 & B2 | A | B |
| 1 | 0 | Transmit Bands B3 & B4 | B | A |

During operation in transmit mode, the control signals are provided to the switches 416 to thereby by configure the antenna switch module for operation in receive mode. Accordingly, both switches 416 are set to position B. The diplexer 420 directs an incoming signal, dependant on frequency of the incoming signal, from the antenna, to either switch 416A or switch 416B. Signals in the upper frequency bands are directed to diplexer 450. The diplexer 450 directs or passes the incoming signal, based upon its frequency, to either filter 412B or filter 412C wherein additional filtering occurs to insure only the signals in the desired frequency band are provided to the receiver, such as an amplifier stage. As shown, signals in band $B_1$ are provided as an output in path 460 while signals in band $B_2$ are provided as an output in path 462.

If the signal is in the lower frequency band then the incoming signal is directed or passed by diplexer 420 to switch 416B, which is in position B to thereby direct the incoming signal to diplexer 454. Diplexer 454 directs or passes the incoming signal, based on frequency to either filter 412D or filter 412E wherein additional filtering occurs to insure only the signals in the desired frequency band are provided to the receiver, such as an amplifier stage. As shown, signals in band $B_3$ are provided as an output in path 464 while signals in band $B_4$ are provided as an output in path 466.

During operation in receive mode, the diplexers and filters provide sufficient isolation between the transmit stages and the other receiver stages to prevent or sufficiently reduce unwanted cross coupling. It is further contemplated that the switches 416 are configured with sufficient isolation to prevent or reduce unwanted cross coupling. To prevent or reduce spurious signals from entering the receive path and providing unwanted distortion, it is contemplated that only one receiver amplifier, such as a low noise amplifier (LNA), may be active during receive mode. Furthermore, all of the unused receiver amplifiers may be powered down or inactive during operation.

As a benefit to this embodiment over prior art embodiments, the configuration of FIG. 4 utilizes only 2 control inputs. This provides a reduction in cost, complexity, size, and reduces the need to use otherwise needed general purpose outputs from a processor or controller to govern operation of the switch antenna module. Prior art embodiments often utilized a different configuration that requires use of a single pole, six throw switch. In addition to being expensive and consuming an undesirably large amount of space, such prior art embodiments consumed six to eight valuable processor outputs. This is an undesirably large number of processor outputs to be consumed to operate only the antenna switch module.

A further benefit of this embodiment is that only two switches are utilized and these switches may be configured as inexpensive type FET switches. In contrast, prior art embodiments utilized an array of eight costly PIN diodes or six to eight pHEMPT/FET switches, which are costly and consume an undesirably large amount of space.

Figure 5:
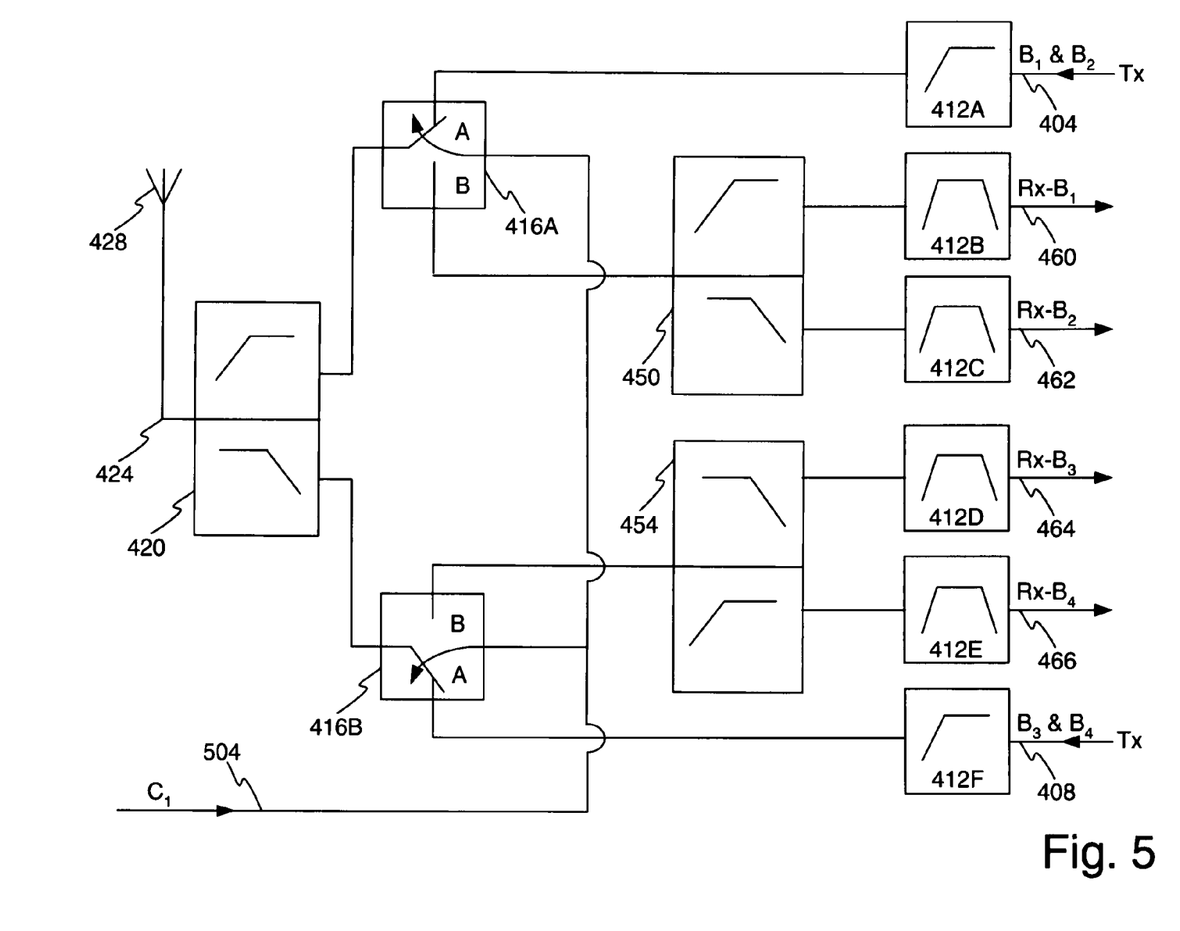
FIG. 5 illustrates an example embodiment of a quad band antenna switch module with one control input.

FIG. 5 illustrates an example implementation of a quad band antenna switch module with one control input. As compared to FIG. 4, similar or identical elements are identified with identical reference numbers. In addition, only the aspects of FIG. 5, which differ from FIG. 4, are discussed in detail. It is contemplated however, that aspects of the system of FIG. 5 may differ from FIG. 4 to accommodate and achieve desired operation in connection with a single control input.

In this example configuration, a single control line 504 connects to switch 416A and 416B as shown. During operation with a single control input, the following table describes the control input values in relation to Tx/Rx status for a single input antenna switch module.

| Control Input C1 | Status | Switch 416A Position | Switch 416B Position |
|---|---|---|---|
| 0 | Receive on all Bands | B | B |
| 1 | Transmit on all Bands | A | A |

During operation in receive mode, the control input on path 504 forces the switch position for switch 416A and 416B to position B. This routes incoming signals, received via the antenna 428 to the diplexers 450, 454. Diplexer 420 operates as described above, by directing or passing incoming signals, based on frequency of the incoming signal, to either switch 416A or 416B. Diplexers 450, 454 also operate as described above by directing or passing incoming signals to the appropriate filter 460-466 which is associated with the frequency band of the incoming signal.

During operation in the transmit mode, the control input forces the switch position to position A thereby connecting both transmit paths to the diplexer 420. The diplexer 420 passes both outgoing signals to the antenna. To prevent unwanted cross-coupling, the diplexer 420 may be configured with isolation between channels or paths. In addition, the switches 416 may also be configured with sufficient isolation to prevent cross-coupling through the switch into the receive portion of the antenna switch band.

When transmitting in the lower frequency band, it may be of particular importance to prevent the $2^{nd}$ harmonic from the lower frequency bands from coupling onto the transmitter output of the upper frequency bands. In a single control line embodiment during transmit mode, all the transmitters from all bands, may be simultaneously connected to the antenna. As a result, the switches 416 may be configured with sufficient isolation to prevent cross-coupling. With the dual control input, the switches are configured with greater than 20 dB of isolation. By way of example, the GSM specification requires 65 dB of isolation. Many power amplifiers have only 45 dB of cross isolation and hence, in a single control input, the additional isolation may need to be established via other means or a power amplifier selected which meets the more stringent 65 dB specification. In one embodiment the switch has less than 20 dB of isolation but the power amplifier may have more than 45 dB of isolation. In other embodiments, or for other standards, the other configuration may be enabled.

In one or more embodiments, it may be desired to utilize or establish the power amplifiers, in addition to or instead of the switches, with sufficient cross isolation to prevent unwanted signals from coupling into a power amplifier from one mode into another mode. For example, it contemplated that the $2^{nd}$ harmonic generated when transmitting in the lower frequency bands may couple into the transmitter associated with the upper frequency bands. In this instance, additional isolation by the power amplifier and adoption of the two control input embodiment as shown in FIG. 4 may be desirable. In other embodiments any amount of switch or amplifier isolation may be possible depending on the selected design parameters.

It is further contemplated that although the embodiments of FIG. 4 and FIG. 5 are shown as embodied with two separate switches, these embodiments or others may be enabled with a single switch, such as for example, a single pole, four throw switch. Such a switch may be enabled with a single or dual control inputs.

Figure 6:
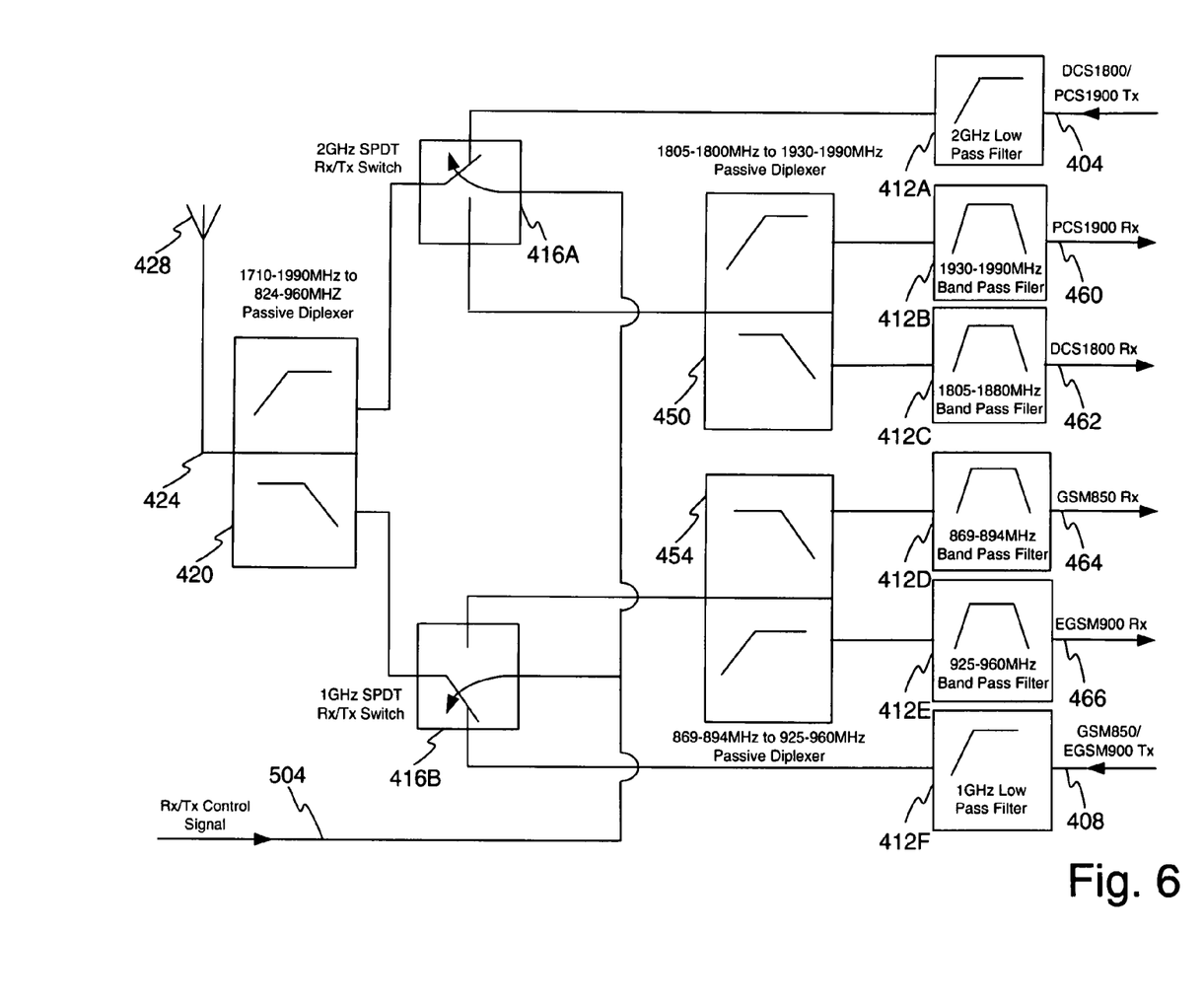
FIG. 6 illustrates an example implementation of a quad band antenna switch.

FIG. 6 illustrates an example implementation of an antenna switch module. This is but one possible implementation and it is contemplated that other implementations are possible that differ from this particular configuration and selection of frequency bands. In this configuration, band $B_1$ comprises Personal Communication Services (PCS) at approximately 1900 MHz (1850 MHz to 1990 MHz). Band $B_2$ comprises Digital Cellular System (DCS) at approximately 1800 MHz (1710 MHz to 1880 MHz). Band $B_3$ comprises Global System for Mobile Communication (GSM850) at approximately 850 MHz (824 MHz to 894 MHz). Band $B_4$ comprises Extended Global System for Mobile Communication (EGSM) at approximately 900 MHz (880 MHz to 960 MHz).

In the embodiment shown in FIG. 6, the diplexer 420 comprises a passive diplexer, although in other embodiments an active diplexer may be utilized. In this implementation, the diplexer 420 comprise diplexer configured to direct or pass incoming signals in the lower band, 824 to 960 MHz to switch 416B while also directing or passing signal in the upper frequency band 1710 to 1990 to switch 416A. In general, for this implementation the frequency cut-off for the switch 420 may be considered as a 1 GHz break point. In other embodiments other frequency break points may be established.

In this example implementation the switch 416A comprises a 2 GHz single pole, double throw (SPDT) Rx/Tx switch while switch 416B comprises a 1 GHz single pole, double throw (SPDT) Rx/Tx switch. In this implementation, the diplexer 450 is configured to direct or pass incoming signals in band $B_2$, 1805 to 1880 MHz, to filter 412C while directing or passing signal in the band $B_1$, 1930 to 1990 to the filter 412B. In this implementation, the diplexer 454 is configured to direct or pass incoming signals in band $B_3$, 869 to 894 MHz, to filter 412D while directing or passing signal in the band $B_4$, 925 to 960 MHz, to filter 412E.

In this implementation, the receive filters 412B-412E are configured as band pass filters and in particular, are configured as follows: Filter 412B—1930 to 1990 MHz pass band; Filter 412C—1805 to 1880 MHz pass band; Filter 412D—869 to 894 MHz pass band; Filter 412E—925 to 960 MHz pass band. In this implementation, the transmit filters 412A and 412F comprise low pass filters and in particular, are configured as follows: Filter 412A—2 GHz low pass filter and Filter 412F—1 GHZ low pass filter. In other embodiments other pass bands or cut-offs may be selected.

During operation, the outgoing signals for DCS and PCS are output from the transmitter to the antenna switch module on path 404 while the outgoing signals for GSM850 and EGSM are output from the transmitter to the antenna switch module on path 408. During receive mode, the PCS signals are output from the antenna switch module on path 460. The DCS signals are output from the antenna switch module on path 462. The GSM850 signals are output from the antenna switch module on path 464. The EGSM signals are output from the antenna switch module on path 466.

As can be appreciated from this example implementation, transmission in the lower bands at approximately 900 MHz may create a $2^{nd}$ harmonic at 1800 MHz, which fall directly in the upper bands. As a result and as discussed above, sufficient isolation, such as via the switches and amplifier configuration, may be critical. Likewise, filtering is important to present only the frequency band of interest to the receiver stage.

While various embodiments of the invention have been described, it will be apparent to those of ordinary skill in the art that many more embodiments and implementations are possible that are within the scope of this invention.

What is claimed is:

1. An antenna switch module for use in a multiband communication device comprising:
    an input/output port configured to connect to an antenna;
    an antenna diplexer connected to the input/output port, the diplexer configured to pass outgoing signals to the antenna and direct incoming signal from the antenna to one of two or more paths;
    one or more switches connected to the diplexer, the one or more switches, responsive to two or fewer control signals, being configured to selectively enable operation of the antenna switch module into transmit or receive mode;
    one or more diplexers in addition to the antenna diplexer connected to at least one output of the one or more switches;
    a filter bank connected to the one or more switches and one or more diplexers, wherein the filter bank comprises two or more filters and is configured to selectively filter incoming and outgoing signals in a frequency dependent manner to tailor operation for a particular band.

2. The module of claim 1, wherein the diplexer is configured to direct incoming signals based on the frequency of the incoming signal.

3. The module of claim 1, wherein the one or more switches comprises two switches.

4. The module of claim 1, wherein the antenna switch module is configured with only two FET switches.

5. The module of claim 1, wherein the antenna switch module is configured as part of a quad band communication device and the output of the filter bank connects to an amplifier stage.

6. The module of claim 1, further comprising a controller or processor configured to generate the two or fewer control signals.

7. A multi-band antenna switch module comprising:

an input/output port configured to connect to an antenna;

a first diplexer connected to the input port configured to direct an incoming signal based on frequency of the incoming signal;

a first switch, responsive to a control signal, configured to receive incoming signals in a first frequency band from the first diplexer and selectively output the incoming signals to a second diplexer and at least one of one or more filters;

a second switch, responsive to a control signal, configured to receive incoming signals in a second frequency band from the first diplexer and selectively output the incoming signals to a third diplexer and at least one of one or more filters;

wherein the second diplexer connects to the first switch and is configured to selectively route incoming signals from the first switch to one or more filters filter based on the frequency of the incoming signal;

wherein the third diplexer configured to selectively route incoming signals from the second switch to one or more filters e filter based on the frequency of the incoming signal; and wherein the one or more filters connected to the second and third diplexer, are configured to selectively pass incoming signals.

8. The module of claim 7, wherein the first switch and the second switch receive the same control signal.

9. The module of claim 7, wherein the first switch receives a first control signal and the second switch receives a second control signal.

10. The module of claim 7, wherein the first and second switches comprise FET switches.

11. The module of claim 7, wherein the first and second switches are embodied in a single pole, four throw switch.

12. The module of claim 7, wherein the first diplexer is configure to direct incoming signals within the 1800 megahertz to 2000 megahertz band to the first switch and direct incoming signals within the 800 megahertz to 1000 megahertz band to the second switch.

13. The module of claim 7, wherein the multi-band antenna switch module receives only two control signals.

14. A method for interfacing an antenna to any one of three one or more amplifier stages in a multi-band communication device comprising:

receiving an incoming signal via an antenna;

providing the incoming signal to a first diplexer wherein the first diplexer selectively directs the incoming signal to one or more switches;

providing two or fewer control signals to the one or more switches to selectively route the incoming signal responsive to a transmit mode or receive mode wherein during receive mode the one or more switches route the incoming signal to a second diplexer, a third diplexer, or both;

selectively directing the incoming signal, with the second diplexer or the third diplexer, to a filter tailored to the frequency band of the incoming signal; and filtering the incoming signal with the filter tailored to the frequency band of the incoming signal to create a filtered signal and providing the incoming signal to the amplifier stage;

wherein the method of interfacing the incoming signal to any one of the three or more amplifier stages requires two or fewer control signals.

15. The method of claim 14, further comprising:

receiving an outgoing signal from a power amplifier;

responsive to the two or fewer control signals, switching the outgoing signal through one or more of the one or more switches to the first diplexer;

passing the outgoing signal through the first diplexer to the antenna.

16. The method of claim 14, wherein the two or fewer control signals comprise one control signal which is provided to all of the one or more switches.

17. The method of claim 14, wherein the one or more switches comprises one switch.

18. The method of claim 14, wherein the one or more switches comprises two FET switches.

19. The method of claim 14, wherein selectively directing the incoming signal with the second diplexer or the third diplexer comprises passing the signal based on the frequency of the incoming signal.

20. The method of claim 14, wherein the method is performed in a quad band communication device equipped with a single antenna.

* * * * *